Figure 2A:
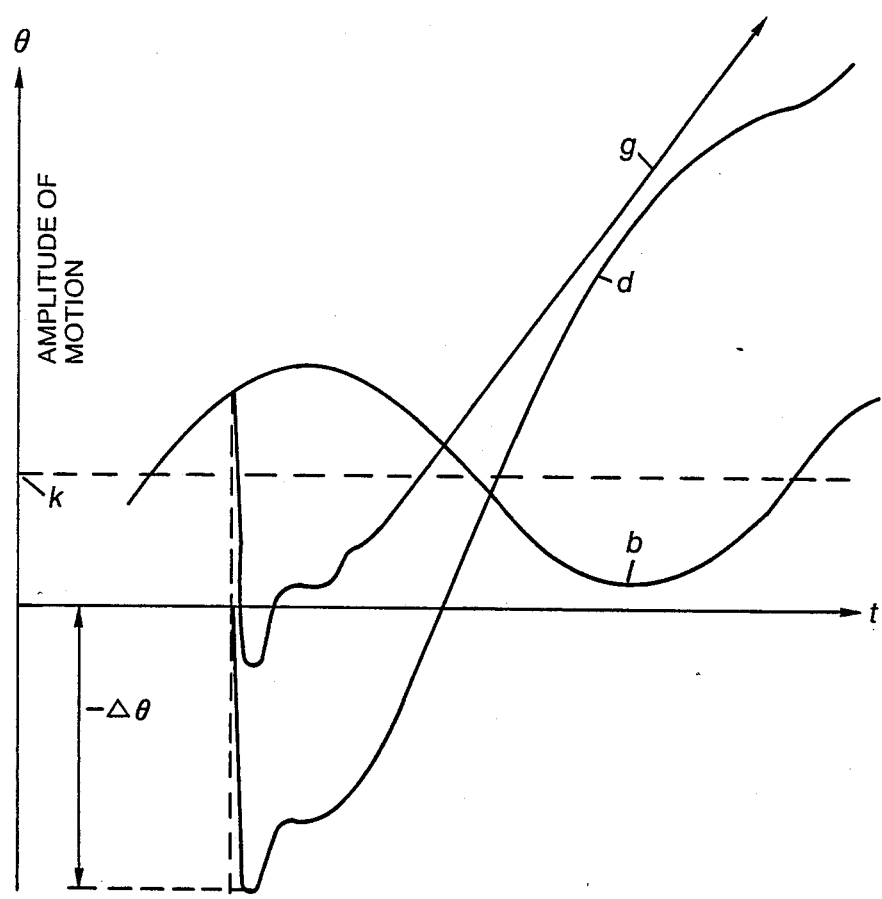

United States Patent [19]

Baas

[11] Patent Number: 4,845,698
[45] Date of Patent: Jul. 4, 1989

[54] METHOD OF SKIPPING TRACKS WHILE SEARCHING FOR A TRACK AND CIRCUITRY FOR CARRYING OUT THE METHOD

[75] Inventor: Dieter Baas, Kehl, Fed. Rep. of Germany

[73] Assignee: Deutsche Thomson-Brandt GmbH, VS-Villingen, Fed. Rep. of Germany

[21] Appl. No.: 15,138
[22] PCT Filed: May 30, 1986
[86] PCT No.: PCT/EP86/00322
    § 371 Date: Feb. 5, 1987
    § 102(e) Date: Feb. 5, 1987
[87] PCT Pub. No.: WO86/07485
    PCT Pub. Date: Dec. 18, 1986

[30] Foreign Application Priority Data

Jun. 5, 1985 [DE] Fed. Rep. of Germany ....... 3520189

[51] Int. Cl.⁴ ............................................. G11B 17/22
[52] U.S. Cl. ........................................ 369/32; 369/43; 369/44
[58] Field of Search .................... 369/44, 43, 32, 33, 369/40, 226, 244, 245, 246

[56] References Cited

U.S. PATENT DOCUMENTS 4,598,394 7/1986 Nonaka .............................. 369/44
4,623,994 11/1986 Nabeshima et al. ................. 369/44

Primary Examiner—William M. Shoop, Jr.
Assistant Examiner—Brian Young
Attorney, Agent, or Firm—Max Fogiel

[57] ABSTRACT

Process for track jumping in track searching process for a rotating information carrier scanned with an optical system, in which the system works in conjunction with a radial coarse (13) and fine (3) drive system. If the coarse drive is immediately put into operation in accordance with the input search direction, the servocircuit of the fine drive system is initially closed and is only opened as a function of criteria prevailing at the time. In this process and in the circuit arrangement envisaged for its implementation, the principal advantage is a high search speed and considerable initial acceleration. In particular, the movement overlaps occurring in the starting phase do not present a problem for the perfect operation of the process.

16 Claims, 5 Drawing Sheets

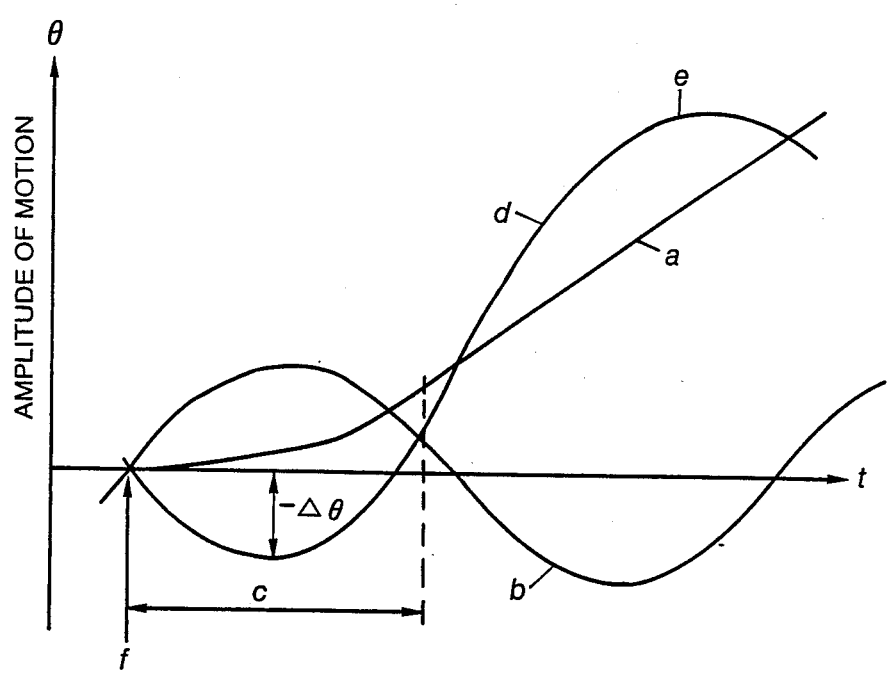
PRIOR ART   *Fig. 1*

METHOD OF SKIPPING TRACKS WHILE SEARCHING FOR A TRACK AND CIRCUITRY FOR CARRYING OUT THE METHOD

The invention concerns a method as in the preamble to the major claim.

The method is especially concerned with preventing the scanning system from moving in undesired directions during the radial scanning of compact disks with equipment that has a simple servo system without a direction-recognition circuit.

Rapid searching for a desired point on the disk by determining the difference tracks between the target and the instantaneous position and establishing them as a reference is state of the art. When the targets are relatively remote, carrying out the search with the fine-drive mechanism alone is insufficient. The procedure consists in principle of switching the coarse-drive mechanism over to rapid search, meaning that the coarse-drive mechanism is accelerated and maintained at high speed, with the fine-drive mechanism control circuit simultaneously being switched off. While the coarse-drive mechanism continues to move (entraining the fine-drive mechanism with it), the radially transversed tracks are detected and counted. As soon as the previously established reference value (the target track) is attained the fine-drive mechanism control circuit is switched on again and the coarse-drive mechanism switched from search mode to control. Search systems that operate on this principle usually have a direction-recognition circuit that determines the direction of the fine- and coarse-drive mechanism in relation to the disk that is being scanned. This device prevents tracks that have been crossed in the wrong direction from being incorrectly identified. Motions of this type, which are incorrect in relation to the prescribed direction, occur in rapidly operating search systems only during the starting and landing phase. This is due first of all to the disk that is being scanned having radial eccentricities that result from disk positioning and retention and from manufacturing tolerances in the disk. During the starting and landing phases, when the coarse-drive mechanism is moving relatively slowly, a motion on the part of the track that derives from the instantaneous direction of a radial disk eccentricity sometimes catches up with or overtakes the motion of the scanner. The resulting direction of motion in relation to the disk will be opposite the prescribed direction. This will be evident from FIG. 1. With search systems that have no direction-recognition circuit no difference can be detected, and tracks that are crossed in the wrong direction are incorrectly evaluated as correct. The result is, however, that an incorrect target is arrived at and corrections must be made. This can lead to essentially longer search times. The second cause of the problem that is to be addressed is a brief incorrect direction of movement during the coarse-drive mechanism starting phase. At the instant of start-up, when, that is, the coarse-drive mechanism is switched on with the fine-drive mechanisms control circuit discontinued, an incorrectly opposed motion can also occur, depending on the instantaneous preliminary diversion of the fine-drive mechanism. Since the coarse-drive mechanism carries out practically no motion during this initial instant, this can lead to traversing a large numer of tracks in the wrong direction. An extreme eccentricity at this point will increase any errors that occur and increase the time needed to find the desired point on the track. FIG. 2 illustrates an example. When the instantaneous fine-drive mechanism operating point is not at the zero point of its range of motion, the error can, as FIG. 2 also shows, be increased even more in the corresponding skip direction.

European OS No. 0 090 379 discloses a search system of this type.

Search systems with direction detectors or direction-recognition circuits are at the present time restricted for reasons of cost to top-of-the-line CD players. In simple search systems with no direction-recognition circuit the aforesaid conditions lead on the one hand to considerably longer searching times. Search systems with a very lhigh searching speed or rapid and brief back-and-forth motions on the part of the fine-drive mechanism like those that can occur during the starting phase are subject on the other hand to serious problems in the design of direction detectors, problems that can be solved only with expensive circuitry. This is especially true when the search is controlled not strictly by hardware but with a microprocessor-supported circuit design.

The object of the present invention is to discover a solution for a search system with servo-controlled radial coarse- and fine-drive mechanisms for the optical scanner of a CD player with no direction-recognition circuit that is relatively inexpensive to manufacture, allows rapid access times, and is comparable in track-detection reliability to systems that operate on the direction-detection system.

This object is attained in accordance with the invention in a method like that recited in the preamble to the first claim by the characteristics recited in the body of that claim.

Further details and embodiments for carrying out the method will be evident in the circuitry recited in the subsidiary claims and in the following description.

The main advantage of the method in accordance with the invention and of the different circuits that carry it out is, aside from its low expense, that high search speeds at high initial accelerations and rapid fine-drive mechanism motion phases superposed on the coarse-drive mechanism of the type that occur especially during the starting phase will cause no problems at all in relation to unobjectionable function on the part of the method. High coarse-drive mechanism search speeds as a matter of fact have a surprising practical and positive effect.

The invention will now be specified with reference to the drawings, wherein

Figure 2B:
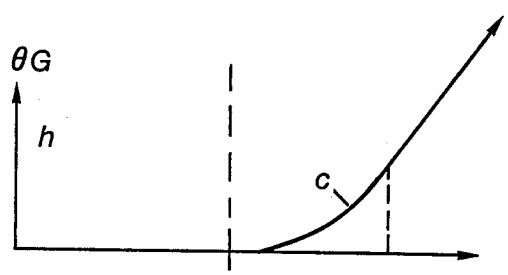
Figure 3:
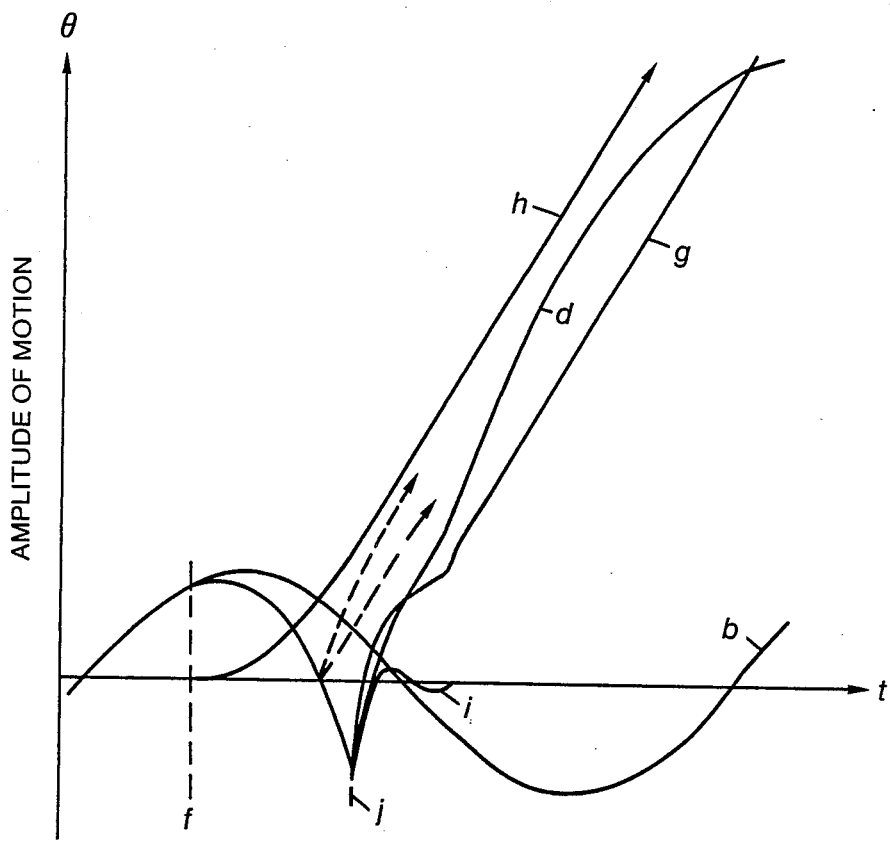
Figure 4:
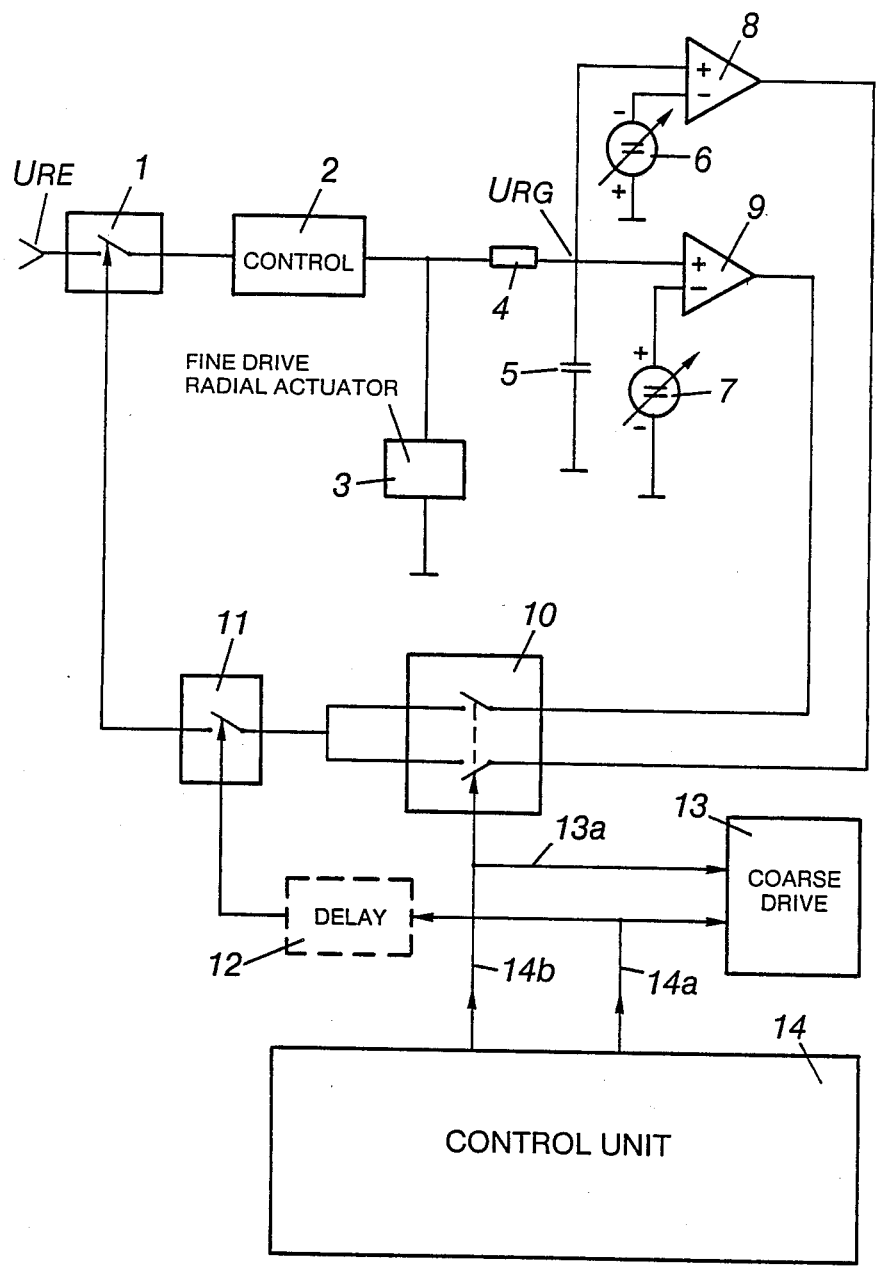
Figure 5:
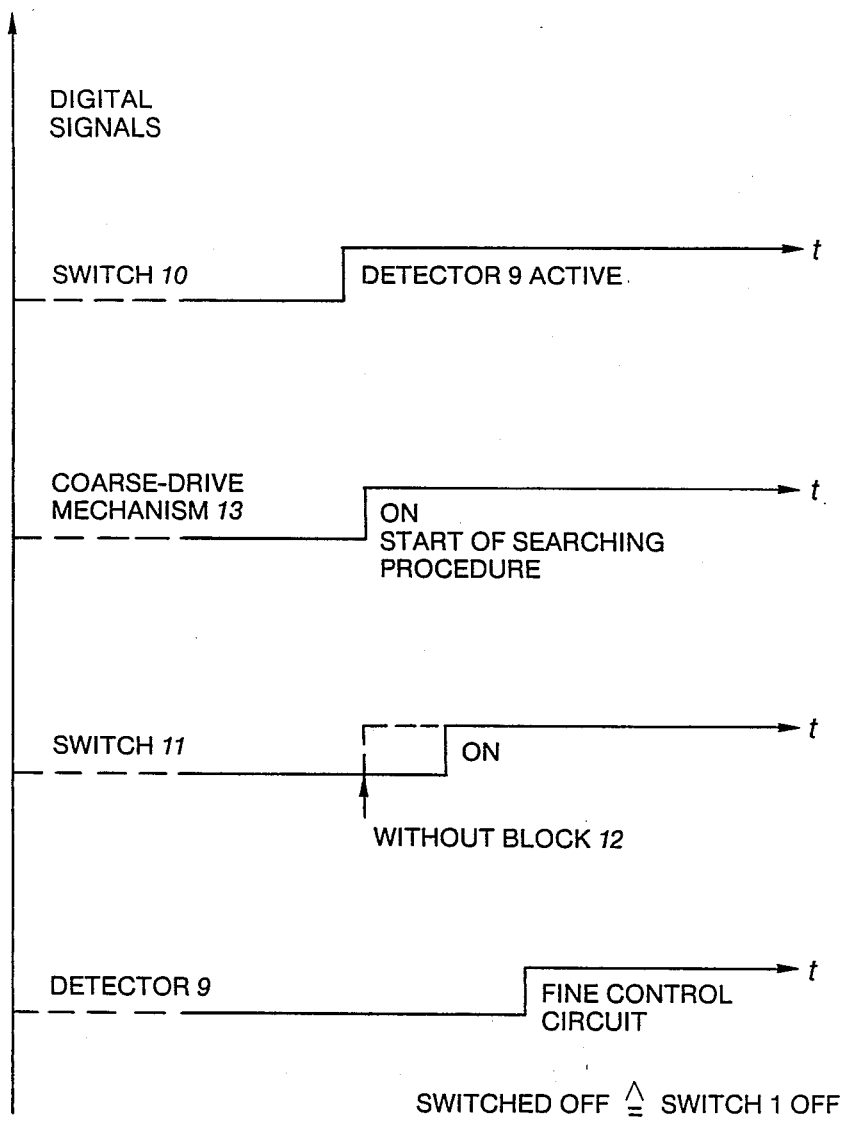

FIG. 1 illustrates motions on the part of an optical scanning system that occur during the starting and search phases (state of the art), FIG. 2a represents motions with the fine-drive mechanism operating point displaced to one side (state of the art), FIG. 2b represents the simultaneous motion of the coarse-drive mechanism (state of the art), FIG. 3 illustrates motions on the part of an optical scanning system during the starting and search phases in the method in accordance with the invention, FIG. 4 is a block diagram of one embodiment of circuitry for carrying out the method, and FIG. 5 is a graph of the individual control signals employed in the circuitry illustrated in FIG. 4 with reference to a particular direction.

FIGS. 1 and 2 are introductory and are intended to illustrate the state of the art.

In FIG. 1 the reference designations are defined as follows:
- $-\Delta\theta$ = extent of tracks traversed in the wrong direction
- a = scanner motion (coarse- and fine-drive mechanism)
- b = radial disk eccentricity
- c = acceleration phase
- d = resulting overall motion of beam over disk
- e = inflection—change in speed due to radial disk unroundness greater than search speed
- f = start of search procedure.

In FIG. 2 the reference designations are defined as follows:
- $-\Delta\theta$ = extent of tracks traversed in the wrong direction
- a = scanner motion (coarse- and fine-drive mechanism)
- b = radial disk eccentricity
- c = acceleration phase
- d = resulting overall motion of beam over disk
- e = inflection—change in speed due to radial disk unroundness greater than search speed
- f = start of search procedure
- g = absolute fine-drive mechanism motion
- h = coarse-drive mechanism motion
- k = fine-drive mechanism operation point.

In the method in accordance with the invention the fine control circuit is not necessarily disconnected immediately during start-up of a search procedure. Various criteria, rather, are polled, and the opening of the fine control circuit depends on the result of this process. Characteristic of the method is that the fine-drive mechanism (and hence the optical scanner) is briefly diverted in a direction opposite the desired direction. This is done by starting the coarse-drive mechanism while the fine-drive mechanism continues to retain the scanner in the istantaneous track. Only when the scanner is sufficiently diverted in opposition to the desired search direction is the fine-drive mechanism control circuit interrupted. Due to the preliminary diversion of the scanner, it can only move in a direction opposite the one that it has been diverted in, specifically in the search direction. If care is taken to ensure that the coarse-drive mechanism is already moving rapidly at this point, the scanner's oscillation back into its zero position cannot be a drawback. This will be evident from FIG. 5. As will also be evident from FIG. 3, the resulting overall motion of the scanner will remain positive, and no tracks will be traversed in the wrong (negative) direction.

In FIG. 3 the reference designations are defined as follows:
- b = radial disk eccentricity
- d = resulting overall motion of beam over disk
- f = start of search procedure
- g = absolute fine-drive mechanism motion
- h = coarse-drive mechanism motion
- i = oscillating in of fine-drive system without superimposed coarse-drive mechanism motion
- j = fine-drive mechanism control circuit opened.

To avoid such return oscillations the fine-drive mechanism control circuit can be interrupted precisely in the zero position as represented by the broken lines in FIG. 3. A drawback here is that, depending on the direction of the skip and on the radial eccentricity due to the unroundness of the disk, the zero transition must be waited for without previously switching on the coarse-drive mechanism. This has the deleterious result of prolonging the access times. Furthermore, in fine-drive mechanisms with an operating point outside the zero line, the latter cannot, depending on the extent of radial eccentricity, be arrived at and can accordingly not be exploited as a decision criterion.

When, furthermore, the scanner is in a position during the search-procedure starting phase that has a beneficial effect on the search direction, a minimum-acceleration phase should generally be maintained for the coarse-drive mechanism with the fine-drive mechanism control circuit still closed. This will prevent oscillating-in processes or radial eccentricities on the part of the disk from having a deleterious effect on the desired direction of motion.

FIG. 4 illustrates by way of example circuitry for carrying out the method. There are two adjustable detectors 8 and 9. Although they are in this case each associated with one search direction, they do not function as direction sensors but as threshold detectors. A deep-pass component (low-pass filter) 4 and 5 derives a signal URG for controlling detectors 8 and 9 from a radial-error signal URE that can be obtained directly from the fine-drive mechanism radial actuator 3 and at the output terminal of controls 2. Control signal URG is directly proportional to the amplitude $\theta$ of motion represented by the ordinate in FIGS. 1, 2, and 3. Detectors 8 and 9 can be employed in conjunction with a switch 1 to switch out the fine-drive mechanism control circuit through a changeover switch 10, which is activated by controls 14 in accordance with the desired direction and which selects the particular detector-output signal, and through another switch 11. Control unit 14 provides signal 14a for turning on the coarse drive motor, and signal 14b for reversing direction. Coarse-drive mechanism 13 receives signal 13a for forward or backward motion.

A delay component 12, which is represented by broken lines, will only be necessary when the thresholds or threshold setters 6 and 7 of detectors 8 and 9 are so low that even a radial eccentricity that occurs during playback will trigger detectors 8 and 9. This delay time is system-related and determined by the acceleration phase of coarse-drive mechanism 13. It is a given constant in this case. It prevents oscillating-in motions on the part of the fine-drive mechanisms along with superposed radial eccentricities on the part of the disk from having negative effects during the starting phase in the aforesaid case.

FIG. 5 is a graph of the individual control signals employed in the circuitry represented by the block diagram in FIG. 4 in relation to a specific desired direction.

I claim:

1. A method of skipping tracks while searching for a track on a rotating information base scanned with an optical system, comprising the steps: operating the system with radial coarse-drive means and with radial fine-drive means; starting said coarse-drive means immediately in a given search direction during track-seeking procedures carried out with said coarse drive means and holding said fine-drive means initially inoperative; selecting predetermined operating conditions subsequently and operating said fine-drive means only dependent on said conditions.

2. Apparatus for skipping tracks while searching for a track on a rotating information base scanned with an optical system, comprising: radial coarse-drive means and radial fine-drive means for operating the system; means for starting said coarse-drive means immediately in a given search direction during track-seek-procedures carried out with said coarse-drive means and holding said fine-drive means initially inoperative; and means for operating said fine-drive means only dependent on criteria obtained subsequently; said fine-drive means comprising servo means; and detector means for actuating said servo means to operate said fine-drive means.

3. Apparatus as defined in claim 2, wherein said detector comprises a zero-point detector.

4. Apparatus as defined in claim 2, wherein said detector has a variable threshold.

5. Apparatus as defined in claim 2, comprising further two threshold detectors for distinguishing between forward and backward search directions, each threshold detector being associated with one direction.

6. Apparatus as defined in claim 2, comprising further a plurality of threshold detectors for distinguishing between forward and backward search directions.

7. Apparatus as defined in claim 2, including analog-to-digital converters for distinguishing between forward and backward search directions.

8. Apparatus as defined in claim 2, including delay means for actuating said fine-drive means to an operative state only after a predetermined time delay.

9. Apparatus as defined in claim 2, including variable delay means for actuating said fine-drive means to an operative state only after a variable time delay.

10. Apparatus for skipping tracks while searching for a track on a rotating information base scanned with an optical system, comprising: radial coarse-drive means and radial fine-drive means for operating the system; means for starting said coarse-drive means immediately in a given search direction during track-seek-procedures carried out with said coarse-drive means and holding said fine-drive means initially inoperative; and means for operating said fine-drive means only dependent on criteria obtained subsequently; said fine-drive means comprising servo means; and detector means for actuating said servo means to operate said fine-drive means; variable delay means for actuating said fine-drive means to an operative state only after a variable delay, said variable delay being determined by extent and direction of radial eccentricity detected during playback starting phase.

11. Apparatus as defined in claim 10, wherein said variable delay is partly dependent on the detected skip width.

12. Apparatus as defined in claim 2, including means for ensuring that a radial eccentricity corresponding to a predetermined search direction is delayed to avoid overshoots.

13. Apparatus for skipping tracks while searching for a track on a rotating information base scanned with an optical system, comprising: radial coarse-drive means and radial fine-drive means for operating the system; means for starting said coarse-drive means immediately in a given search direction during track-seek-procedures carried out with said coarse-drive means and holding said fine-drive means initially inoperative; and means for operating said fine-drive means only dependent on criteria obtained subsequently; said fine-drive means comprising servo means; and detector means for actuating said servo means to operate said fine-drive means; and means for actuating said fine-drive means to an operative state only when a scanning beam has been forceably extracted from a track.

14. Apparatus as defined in claim 13, including means for deriving also the instant at which said fine-drive means becomes operative from extent of a skip width.

15. Apparatus as defined in claim 13, wherein said fine-drive means has amplification means with amplification decrease during the coarse-drive means starting phase.

16. Apparatus as defined in claim 2, wherein the coarse-drive means acceleration phase has a predetermined interval and search speed of said coarse-drive means has a predetermined magnitude.

* * * * *